United States Patent [19]

Betso et al.

[11] Patent Number: 4,937,279
[45] Date of Patent: Jun. 26, 1990

[54] EXTRUDABLE POLYMERIC COMPOSITIONS

[75] Inventors: Stephen R. Betso, Midland; Duane F. Foye, Merrill; G. Edwin Vrieland, Midland, all of Mich.

[73] Assignee: The Dow Chemical Company, Midland, Mich.

[21] Appl. No.: 230,932

[22] Filed: Aug. 11, 1988

[51] Int. Cl.$^5$ .............................................. C08K 3/32
[52] U.S. Cl. .................................... 524/417; 524/706; 428/34.7
[58] Field of Search ............................... 524/417, 706

[56] References Cited

U.S. PATENT DOCUMENTS 3,673,050  6/1972  Newman, Jr. et al. ............. 524/417
3,876,731  4/1975  Woodhead ........................... 260/880
4,345,040  8/1982  Hall ..................................... 524/417

Primary Examiner—Melvyn I. Marquis
Assistant Examiner—Karen A. Hellender
Attorney, Agent, or Firm—Thomas D. Zindrick

[57]  ABSTRACT

The present invention is a polymeric composition with improved extrudability comprising a vinylidene chloride interpolymer and a Group IIA alkaline-earth hydroxyphosphate, which is incorporated with the vinylidene chloride interpolymer by advance addition, polymer slurry addition or, finally, by dry blending addition. The Group IIA alkaline-earth hydroxyphosphate will be present in an amount of between about 0.01 to about 5 weight percent, said weight percents being based on the total weight of the polymeric composition.

10 Claims, No Drawings

EXTRUDABLE POLYMERIC COMPOSITIONS

FIELD OF THE INVENTION

The present invention relates to a thermally sensitive polymeric composition possessing decreased thermal sensitivity.

BACKGROUND OF THE INVENTION

Vinylidene chloride interpolymers are well-known in the prior art. Such polymers are also well-known to be thermally sensitive, which means that upon exposure to desirable processing temperatures such polymers tend to thermally decompose, e.g., generate carbonaceous material contamination, discolor or evolve hydrogen chloride.

In the past, the practice has been to extrude polymeric compositions comprising a vinylidene chloride interpolymer directly from the form in which it is recovered. Because of the convenience of shipping and handling, it is desirable to form such polymeric compositions into pellets prior to final extrusion. As the demand for pellets has increased, the demand has increased for a pellet which can withstand the myriad processing conditions to which powdered resins are subjected.

While pellets of polymeric compositions comprising vinylidene chloride interpolymers may be an advantageous form from which to fabricate articles, the pellets of such polymeric compositions are particularly difficult to extrude. Pellet formation requires an exposure of the thermoplastic composition to heat prior to the conventional extrusion step of the polymeric composition into articles. This additional heat history is believed to make the vinylidene chloride interpolymer in pellet form even more susceptible to thermal instability than a vinylidene chloride interpolymer in powder form. Consequently, additive packages which improve the thermal stability of polymeric compositions comprising vinylidene chloride interpolymer in powder form do not necessarily improve the thermal stability of such polymeric compositions in pellet form.

Although satisfactorily extrudable for a relatively short period, it has been found that attempts to extrude vinylidene chloride interpolymer pellets over long periods on certain extrusion equipment have also proven unsatisfactory due to the thermal sensitivity of the vinylidene chloride interpolymer and, consequently, an undesirable level of carbonaceous material contamination, increased discoloration or higher hydrogen chloride in the extrudate.

It is desirable to produce a polymeric composition which is less thermally sensitive than vinylidene chloride interpolymer alone; and consequently, which can be extruded, in either powder or pellet form, into an extrudate which possesses less carbonaceous material contamination, less discoloration or less hydrogen chloride evolvement than an extrudate formed from vinylidene chloride interpolymer alone. It is to this goal that the present invention is directed.

SUMMARY OF THE INVENTION

The present invention is a polymeric composition comprising a mixture of a vinylidene chloride interpolymer and a quantity of a Group IIA alkaline-earth hydroxyphosphate in an amount of from about 0.01 to about 5 weight percent, said weight percents being based on the total weight of the mixture; as well as pellets and articles formed therefrom.

DETAILED DESCRIPTION OF THE INVENTION

The present invention concerns a polymeric or plastic composition having improved extrudability. The composition comprises a vinylidene chloride interpolymer and a Group IIA alkaline-earth hydroxyphosphate. By "polymeric or plastic" composition is meant a mixture of the interpolymer and Group IIA alkaline-earth hydroxyphosphate, as well as other additives.

For the purposes of this invention, improved extrudability means that, if subjected to desirable elevated processing temperatures, polymeric composition is less thermally sensitive; and consequently, the extrudate possesses a reduced level of carbonaceous material contamination, reduced discoloration or less hydrogen chloride evolvement.

By "extrudate" is meant any composition which becomes partially or totally melted when subjected to elevated temperatures during processing methods, e.g., casting, blowing, extrusion, molding, injection molding, blow molding, coextrusion, laminating or calendering.

The term "vinylidene chloride interpolymer" encompasses homopolymers, copolymers, terpolymers, etc. of vinylidene chloride. The polymeric compositions are prepared from a polymerizable mixture comprising a predetermined amount of vinylidene chloride monomer and also a predetermined amount of ethylenically unsaturated comonomer copolymerizable therewith.

In preparing the monomer phase, such phase comprises a mixture containing essentially all of the monomer to be polymerized. An effective amount of polymerized vinylidene chloride monomer is generally in the range of from about 60 to about 99 percent by weight of interpolymer, with the preferred ranges, as is known to the skilled artisan, dependent upon the ethylenically unsaturated comonomer copolymerized therewith.

The amount of ethylenically unsaturated comonomer is maintained below an amount sufficient to destroy the semicrystalline character of the interpolymer. By "semicrystalline character" it is meant that the interpolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride*, Vol. 5, Gordon and Breach Science Publishers, New York (1977), the teachings of which are incorporated herein by reference.

The effective amount of ethylenically unsaturated comonomer or comonomers copolymerizable with the vinylidene chloride monomer are present in the monomer mixture in an amount of from about 1 to about 40 weight percent, said weight percents being based on total monomer mixture weight.

Suitable ethylenically unsaturated comonomers copolymerizable with the vinylidene chloride monomer include vinyl chloride, alkyl acrylated, alkyl methacrylates acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate and methylmethacrylate.

When the ethylenically unsaturated comonomer employed is a vinyl chloride, the vinyl chloride will preferably be present in an amount of from about 30 to about 5 percent by weight of interpolymer and vinylidene chloride will be present in an amount of from about 70 to about 95 percent by weight of interpolymer; and preferably the vinyl chloride will be present in an amount of from about 25 to about 10 percent by weight of interpolymer and the vinylidene chloride will be present in an amount of from about 75 to about 90 percent by weight of interpolymer.

When the ethylenically unsaturated comonomer employed is an alkyl acrylate, the alkyl acrylate will preferably be present in an amount of from about 30 to about 2 percent by weight of interpolymer and the vinylidene chloride will be present in an amount of from about 98 to about 70 percent by weight of interpolymer; and preferably the alkyl acrylate will be present in an amount of from about 40 to about 6 percent by weight of interpolymer and the vinylidene chloride will be present in an amount of from about 94 to about 60 percent by weight of interpolymer.

Methods of forming the vinylidene chloride interpolymers are well-known in the prior art. The vinylidene chloride interpolymer is generally formed through an emulsion or suspension polymerization process. Exemplary of such processes are U.S. Pat. Nos. 2,558,728: 3,007,903: 3,642,743: and 3,879,359; and the methods described by R. A. Wessling, in *Polyvinylidene Chloride Gordon*, and Breach Science Publishers, New York (1977), Chapter 3; all of which are incorporated herein by reference.

In the emulsion or suspension process, a monomer phase is suitably emulsified or suspended in an aqueous phase through the use of emulsifying or suspending agents. An initiator and surface active agent capable of emulsifying or suspending the monomeric materials in the aqueous phase is then added to the solution and polymerization of the monomers allowed to proceed until achieving its desired degree of conversion. The polymerization of the monomeric materials is usually carried out with heating and agitation.

A relatively small amount of a water-soluble suspending agent or emulsifying agent is used as hereinafter described, and the predominant proportion of monomer is uniformly admixed along with at least about 0.01 weight percent, preferably between about 0.1 and 1 weight percent, said weight percents being based on the weight of the monomer, of the water-soluble dispersing agent and between about 0.1 and 0.5 weight percent of a monomer-soluble polymerization initiator.

Exemplary water-soluble suspending or emulsifying agents are the water-soluble alkyl or hydroxyalkyl cellulose ethers wherein the alkyl group contains 1 to 2 carbon atoms and the hydroxyalkyl groups contain from 2 to 4 carbon atoms. Any viscosity grade of the cellulose ethers may be used although it is preferred to use the lower viscosity grades such as 10 cps to 400 cps. The low viscosity grades of methyl cellulose and hydroxypropyl methyl cellulose are more easily dissolved in water than the higher viscosity grades. By "viscosity grade" as herein used is meant the viscosity of a 2 percent aqueous solution of the cellulose ether measured at 20° C. The process of this invention prepares a polymer in granular or bead form which is readily isolatable from the polymerization system by simple means, such as filtration. Washing with water will remove most of the residual components of the dispersant and catalyst system.

Exemplary initiators contemplated for use in the present invention include the peroxides, such as hydrogen peroxide, isopropyl peroxypercarbonate, lauroyl peroxide or mixtures thereof.

Although the order of addition of the various ingredients is not critical, it is preferred to prepare the complete aqueous phase including initiator, and emulsifier or suspending agent and then to add the monomer phase. In preparing the aqueous phase, it has been found to be most convenient, although not critical, to solubilize the emulsifier or suspending agent, and then to add the initiator. Although the amount of water used has little effect on the process, it is preferred to operate the polymerization process in the range of from about 2 to about 4 parts per water per part of monomer. When less water is used, there may be insufficient heat transfer to carry away the heat of polymerization.

Except as specifically set forth herein, polymerization conditions (e.g., temperature and agitation) are those conventionally employed in the polymerization of vinylidene chloride.

When the monomer is added to the aqueous phase (monomer-in-water phase), the mixture is heated with agitation, in the substantial absence of oxygen, to a temperature of between about 25° C. and 85° C. and preferably between about 45° C and about 60° C, for a period sufficient to provide the desired conversion of monomer to polymer. Generally, the conversion of monomer to polymer is between about 80 and 99 percent, and preferably between about 88 and 95 percent.

After polymerization is complete, the resulting suspension or emulsion slurry of vinylidene chloride interpolymer is then vacuum stripped to form a monomer free slurry. Thereafter, the slurry is cooled down, unloaded and dewatered and vinylidene chloride interpolymer is collected and further dried. The resin may be subsequently hydrated to reform the polymer slurry. The process may also include using prefilter, an electrofilter, a final dryer such as a fluid energy dryer and the like.

By "Group IIA alkaline-earth hydroxyphosphate" is meant a phosphate having an apatite structure, as defined in *The Condensed Chemical Dictionary*, 10th Edition (1983), the teachings of which are hereby incorporated by reference. Exemplary Group IIA alkaline earth hydroxyphosphates include beryllium hydroxyphosphate, calcium hydroxyphosphate, magnesium hydroxyphosphate, strontium hydroxyphosphate, barium hydroxyphosphate, radium hydroxyphosphate; and equivalents thereof. Calcium hydroxyphosphate and magnesium hydroxyphosphate are particularly preferred.

The basic chemical formula of calcium hydroxyapatite (also called hydroxylapatite) is $Ca_{10}(PO_4)_6(OH)_2$. Calcium hydroxyapatite is held together primarily by ionic bonding: the calcium ions are divalent cations ($Ca^{++}$), the phosphate ions are trivalent anions ($PO_4^{---}$) and hydroxyl ions are monovalent anions ($OH^-$).

The polymeric composition is suitably formed by incorporating at least one Group IIA alkaline-earth hydroxyphosphate in the polymeric composition in an amount of from about 0.01 to about 5 weight percent, said weight percents being based on the total weight of the polymeric composition. Preferably, the polymeric composition is suitably formed by incorporating the vinylidene chloride interpolymer with the Group IIA alkaline-earth hydroxyphosphate in an amount of from about 0.1 to about 3 weight percent, said weight percents being based on the total weight of the polymeric composition. Most preferably, the polymeric composition is suitably formed by incorporating the vinylidene chloride interpolymer with the Group IIA alkaline-earth hydroxyphosphate in an amount of from about 0.2 to about 1 weight percent, said weight percents being based on the total weight of the polymeric composition. The relative weight percentages within the prescribed range will vary with the particle size of the Group IIA alkaline-earth hydroxyphosphate employed: the weight percent is easily ascertainable by one skilled in the art without undue experimentation. A suitable calcium hydroxyphosphate is that commercially available from the Monsanto Company under the trade designation "TCP" tricalcium phosphate.

Group IIA alkaline-earth hydroxyphosphates are prepared by processes well-known in the art. By way of illustration only, techniques for preparing tricalcium phosphate are set forth in *The Merck Index*, 10th Edition (1983), the teachings of which are hereby incorporated by reference.

Persons skilled in the art will recognize that the effectiveness of the Group IIA alkaline-earth hydroxyphosphates are generally related to the surface area of the salt employed. For purposes of this invention, the Group IIA alkaline-earth hydroxyphosphates generally have an average particle diameter of from about 1 to about 50 microns. One skilled in the art, without undue experimentation, will be able to determine the optimum particle size for specific applications.

The Group IIA alkaline-earth hydroxyphosphate may be added at any stage of the conventional process for preparing the vinylidene chloride interpolymers. That is, as will be described below, the Group IIA alkaline-earth hydroxyphosphate may be loaded in a reactor with the monomers before polymerization (advance addition); may be added to the vinylidene chloride dispersion (polymer slurry addition); or finally, may be blended with the vinylidene chloride following drying (dry addition). Furthermore, the Group IIA alkaline-earth hydroxyphosphate may be incorporated using a combination of the aforementioned three methods.

If advance addition of the Group IIA alkaline-earth hydroxyphosphate is employed, the exact amount of Group IIA alkaline-earth hydroxyphosphate which is initially dispersed in the monomer mixture will depend upon the pH of the monomer mixture; the pH profile, i.e., the change in pH during the reaction: the phase ratio of the monomer mix, i.e., the monomer to aqueous ratio; the solubility of the Group IIA alkaline-earth hydroxyphosphate in the water; and the desired loading in the polymeric composition. Once the above parameters are determined, a skilled artisan will be able to select the amount of Group IIA alkaline-earth hydroxyphosphate which is necessary.

If the pH of the aqueous phase in the monomer mixture is too high or too low, discoloration of the polymeric composition may occur. Regardless of when the Group IIA alkaline-earth hydroxyphosphate is added to the process, the pH of the aqueous phase should be adjusted, if necessary, and maintained in the range of about 4 to about 10.

If polymer slurry addition of the Group IIA alkaline-earth hydroxyphosphate is employed, the amount of Group IIA alkaline-earth hydroxyphosphate added by polymer slurry addition depends upon a number of variables. Generally, the amount of Group IIA alkaline-earth hydroxyphosphate which is incorporated into the polymer slurry is dependent upon the ratio of polymer to water before drying, the pH of the aqueous phase, the solubility in the aqueous phase, the amount of Group IIA alkaline-earth hydroxyphosphate employed and the desired amount of Group IIA alkaline-earth hydroxyphosphate in the polymeric composition. The above factors may be readily varied to produce desired resin within the scope of the invention without undue experimentation.

The pH of the resultant slurry is generally in the range of from about 2 to about 5. The pH of the slurry after polymerization will be dependent upon whether the Group IIA alkaline-earth hydroxyphosphate is added to the monomer mixture, the polymerization initiator chosen, the extent of dehydrochlorination of the polymer and any water-soluble species added to facilitate polymerization.

A variety of conventional additives may also be incorporated into the polymeric composition. Additive type and amount will depend upon several factors. One factor is the intended use of the blends. A second factor is tolerance of the blends for the additives. That is, how much additive can be added before physical properties of the blends are adversely affected to an unacceptable level. Other factors are apparent to those skilled in the art of polymer formulation and compounding.

Exemplary additives include plasticizers, heat stabilizers, light stabilizers, pigments, processing aids, lubricants and the like. Each of these additives is known and several types of each are commercially available.

The additives may be incorporated into the polymeric composition by using melt processing, as well as dry blending techniques for thermally sensitive polymers The additives may be incorporated concurrently or may be incorporated consecutively with the vinylidene chloride interpolymer and the Group IIA alkaline-earth hydroxyphosphate.

When blending the vinylidene chloride interpolymer, Group IIA alkaline-earth hydroxyphosphate, and any additives, three conditions should be met. Two conditions, which are interrelated, are processing time and processing temperature. In melt processing thermally sensitive polymers, it is generally recognized that as processing temperatures increase, processing times must decrease in order to avoid undesirable results such as thermal decomposition. Melt processing must be accomplished at a temperature below that at which thermal decomposition of the vinylidene chloride interpolymer becomes significant. A third condition is that sufficient mixing must be generated during melt processing to provide a visually homogeneous blend, i.e., no visible solids, within a reasonable mixing time.

Exemplary melt processing equipment includes heated two-roll compounding mills, Brabender mixers, Banbury mixers, single screw extruders, twin screw extruders and the like, which are constructed for use with thermally sensitive polymers. See, for example, the discussion by R. A. Wessling, in Chapter 11 of *Polyvinylidene Chloride*, Vol. 5, Gordon and Breach Science Publishers, New York (1977), the teachings of which are incorporated herein by reference. Desirable results are obtained when an extruder, either a single screw or a twin screw, is used for melt processing the components of the polymeric composition.

When dry blending, the components should be mixed to form a visually uniform admixture. Suitable dry blending equipment includes Hobart mixers, Welex mixers, Henschel High Intensity mixers, Diosna mixers, Littleford mixers and the like.

Methods of forming the polymeric composition into pellets are well-known to those skilled in the art. Any method capable of forming the polymeric composition into pellets is suitable for use in the present invention. For the purposes of this application, the terms "pellet" or "pellets" refer to particles having a cross-sectional dimension of between about 1/32 inch and ¼ inch, preferably between about 1/16 inch and about ⅜ inch, and most preferably from about ⅛ inch and ¼ inch. An exemplary method of forming the polymeric composition into pellets includes extruding the polymeric composition through a strand die to form an extruded strand and then chopping the extruded strand into pellets.

The polymeric composition, in either powder or pellet form, may be fabricated into any suitable final product, e.g., a variety of films or other articles. As is well-known in the art, films and articles are fabricated with conventional coextrusion, e.g., feed-block coextrusion, multimanifold die coextrusion or combinations of the two; injection molding; coinjection molding; extrusion molding: and lamination techniques. Articles formed therefrom include blown and cast films and mono and multilayer films: rigid and foam sheet; tubes: pipes; rods: fibers and various profiles. Lamination techniques are particularly suited to produce multi-ply sheets. As is known in the art, specific laminating techniques include fusion, i.e., whereby self-sustaining lamina are bonded together by applications of heat and pressure; wet combining, i.e., whereby two or more plies are laminated using a tie coat adhesive, which is applied wet, the liquid driven off, and combining by subsequent pressure laminating in one continuous process: and heat reactivation, i.e., combining a precoated film with another film by heating and reactivating the precoat adhesive so that it becomes receptive to bonding after subsequent pressure laminating.

Exemplary articles include rigid containers used for the preservation of food, drink, medicine and other perishables. Such containers should have good mechanical properties, as well as low gas permeabilities, for example, oxygen, carbon dioxide, water vapor, odor bodies or flavor bodies, hydrocarbons or agricultural chemicals. Consequently, multilayer sheet structures employed in packaging materials have organic polymer skin layers laminated on each side of a vinylidene chloride interpolymer barrier layer, generally with glue layers used to promote adhesion between the barrier layer and dissimilar material layers.

The present invention is illustrated in further detail by the following examples. The examples are for the purposes of illustration only, and are not to be construed as limiting the scope of the present invention. All parts and percentages are by weight unless otherwise specifically noted.

EXAMPLES

Cross-linking Time Testing

Example 1

Samples of polymeric compositions are formed polymerizable mixtures through a suspension polymerization process. The polymeric compositions are each prepared as follows: Into a ten-gallon stirred polymerization reactor is loaded 16,500 grams of demineralized water, 0.4 grams of di-tert-butylmethylphenol: 42 grams of lauroyl peroxide and 17.0 grams of Methocel ® KHM brand cellulose ether as a suspending agent. To the water in the reactor is added 9000 grams of a mixture comprising about 94 weight percent of vinylidene chloride monomer and about 6 weight percent of methyl acrylate: and 90 grams calcium hydroxyphosphate which is commercially available from Monsanto Chemical Company, under the trade designation tricalcium phosphate, polymer grade.

The reactor is sealed, purged with nitrogen and elevated to a temperature of about 25° C. After polymerization has begun, the temperature is raised to 80° C. and polymerization is allowed to continue for about 16 hours. The pH of the aqueous phase of the resultant polymeric material is 4–5. The resultant polymeric material is vacuum stripped, dried and recovered in powder form.

The powder is placed in the bowl of a Brabender ® Plasti-Corder Rheometer. The bowl is maintained at a temperature of 175° C., and the speed of the blades is 60 RPM. The size of the sample is 50 grams, the cross-linking time for the formulation is about 45 minutes.

Color and Clarity Testing

Examples 2–5

Each of the polymeric components used in the examples is coded and described hereinafter at Table 1.

TABLE I

| Polymer Components | |
|---|---|
| Code | Polymer |
| AEHP | Calcium hydroxyphosphate, a Group II alkaline-earth hydroxyphosphate, which is commercially available from Monsanto Chemical Company under the trade designation tricalcium phosphate, polymer grade. |
| PVdC | A vinylidene chloride copolymer formed from a monomer mixture having a loading of 87% vinylidene chloride and 13% vinyl chloride. The copolymer has a major melting point of about 160° C. and a weight average molecular weight of 110,000. |
| ESO | Epoxidized soybean oil, which is commercially available from the Viking Chemical Company. |

The vinylidene chloride interpolymer is blended into mixtures with various quantities of the Group IIA alkaline-earth hydroxyphosphate. The mixtures are formed by dry blending the two components in a Hobart mixer, for a period of approximately one hour. The mixtures are extruded through a ¾" extruder having a length to diameter ration of 25/1. The extruder has the following set temperatures: (a) hopper temperature=160° C.; (b) melt zone temperature=170° C.; and (c) die temperature=175° C.

The molten polymer blends are passed through a ¾" extruder die and extruded into a tape. The blends are extruded in a continuous process for a period of about 20 minutes. The decomposition of the extruded resin is then determined on the extrudate tape. The extrudate tapes are visually inspected to determine their color. Color is qualitatively rated on a scale of 1 to 10 over a continuous range of discoloration, wherein 1 represents a creamy white color and 10 a rather dark brown.

The extrudate tape is also visually inspected to determine its clarity. Clarity is qualitatively rated on a scale of 1 to 10 over a continuous range of transparency, wherein 1 represents a transparent sample and 10 an opaque sample.

Results of Examples 2-5 are set forth in Table II.

TABLE II

| Example | AEHP [1] (%)[b] | PVdC [2] (%) | Clarity [3] | Color [4] |
|---|---|---|---|---|
| 2 | 0.5 | balance | 1 | 2 |
| 3 | 1.0 | balance | 1 | 5 |
| 4 | 2.0 | balance | 2 | 8 |
| 5 | 3.5 | balance | 7 | 9 |

[b] AEHP = calcium hydroxyphosphate as set forth in Table 1. % = weight percents based upon the total weight of the dry blend.
[2] PVdC = a vinylidene chloride interpolymer as set forth in Table I. % = weight percents based upon total weight of the dry blend.
[3] clarity = according to visual inspection.
[4] color = according to visual inspection.

As can be seen from the above table, the compositions of the present invention possess excellent extrudability as evidenced by the good color and clarity of the extruded samples.

Examples 6-7

Examples 2 and 5 are repeated with the following exceptions: the mixtures of vinylidene chloride interpolymer and calcium hydroxyphosphate are extruded through a single strand die, passed through a water bath and then pelletized. The strand die has an internal diameter of 0.32 centimeter. Pelletizing is accomplished using a Model 304, 15.24 centimeter strand cutter commercially available from Conair Incorporated. The pellets exhibited good color and clarity.

Examples 8-9

Examples 2 and 5 are repeated with the following exceptions the vinylidene chloride interpolymer is formed from a monomer mixture comprising about 94 weight percent vinylidene chloride and about 6 weight percent methyl acrylate, based on total monomer mixture weight. The extrudate tapes exhibited good color and clarity.

Color Testing After Multiple Extrusion

Example 10

The polymeric composition is formed by blending the following components into a mixture: 98.6 weight percent of PVDC as defined in Table 1, 0.4 weight percent of AEHP as defined in Table 1 and 1.2 weight percent of ESO as defined in Table 1.

The mixture is formed by dry blending the components in a Hobart mixer for a period of approximately one hour. The mixture is then extruded through a $\frac{3}{4}''$ extruder having a length to diameter ratio of 25/1. The extruder has the following set temperatures: (a) hopper temperature = 130° C.: (b) melt zone temperature = 140° C.: and (c) a die temperature = 145° C.

The extrudate is then passed through a single strand die, passed through a water bath and then pelletized. The strand die has an internal diameter of 0.32 centimeter. Pelletizing is accomplished using a Model 304, 15.24 centimeter strand cutter commercially available from Conair Incorporated.

The pellets are extruded through the same extruder and single strand die as employed to originally pelletize the polymeric compositions. Each repelletized polymeric composition, designated by a separate Pass No., is compared with the initially pelletized polymeric composition to determine the color change between the initial pellets and the subsequently extruded and repelletized polymeric compositions.

The total color change and specific compositions tested are set forth in Table III.

TABLE III

| Example | AEHP [1] (%) | ESO [2] (%) | PVdC [3] (%) | Repelletizations (Color) [4] | | | | |
|---|---|---|---|---|---|---|---|---|
| | | | | Pass 1 | Pass 2 | Pass 3 | Pass 4 | Pass 5 |
| | 0.4 | 1.2 | balance | 1 | 3 | 4 | 5 | 6 |

[1] AEHP = a calcium hydroxyphosphate as set forth in Table I. % = weight percent based upon total weight of the polymeric composition.
[2] ESO = epoxidized soybean oil as set forth in Table I. % = weight percent based upon total weight of the polymeric composition.
[3] PVdC = a vinylidene chloride interpolymer as set forth in Table I. % = weight percent based upon total weight of the polymeric composition.
[4] Color of pellets after successive repelletizations; color is determined according to visual inspection.

Although the invention has been described in considerable detail, with reference to certain preferred embodiments thereof, it will be understood that variations and modifications can be affected within the spirit and scope of the invention as described above and as defined in the appended claims.

What is claimed is:

1. A polymeric composition which comprises:
   (A) a Group IIA alkaline-earth hydroxyphosphate in an amount of from about 0.01 to about 5 weight percent, said weight percents being based on the total weight of the polymeric composition; and
   (B) a vinylidene chloride interpolymer formed from a monomer mixture comprising vinylidene chloride in an amount of from about 60 to about 99 weight percent and at least one ethylenically unsaturated comonomer copolymerizable therewith in an amount of from about 1 to about 40 weight percent, said weight percents being based on the total weight of the monomer mixture.

2. The polymeric composition of claim 1 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

3. The polymeric composition of claim 1 wherein the Group IIA alkaline-earth hydroxyphosphate is present in an amount of from about 0.1 to about 3 weight percent, said weight percents being based on the total weight of the polymeric composition.

4. The polymeric composition of claim 3 wherein the Group IIA alkaline-earth hydroxyphosphate is present in an amount of from about 0.2 to about 1 weight percent, said weight percents being based on the total weight of the polymeric composition.

5. The polymeric composition of claim 1 wherein the Group IIA alkaline-earth hydroxyphosphate is selected from the group consisting of beryllium hydroxyphosphate, calcium hydroxyphosphate, magnesium hydroxyphosphate, strontium hydroxyphosphate, barium hydroxyphosphate, radium hydroxyphosphate and mixtures thereof.

6. A polymeric composition which comprises:
(A) a Group IIA alkaline-earth hydroxyphosphate in an amount of from about 0.2 to about 1 weight percent, said weight percents being based on the total weight of the polymeric composition, the Group IIA alkaline-earth hydroxyphosphate being selected from the group consisting of beryllium hydroxyphosphate, calcium hydroxyphosphate, magnesium hydroxyphosphate, strontium hydroxyphosphate, barium hydroxyphosphate, radium hydroxyphosphate and mixtures thereof and
(B) a vinylidene chloride interpolymer formed from a monomer mixture comprising vinylidene chloride in an amount of from about 60 to about 99 weight percent and at least one ethylenically unsaturated comonomer copolymerizable therewith in an amount of from about 1 to about 40 weight percent, said weight percents being based on the total weight of the monomer mixture.

7. The polymeric composition of claim 1 wherein the composition is in the form of a pellet.

8. The polymeric composition of claim 6 wherein the composition is in the form of a pellet.

9. An article for the storage of foods, said article formed from a polymeric composition which comprises:
(A) a Group IIA alkaline-earth hydroxyphosphate in an amount of from about 5 to about 0.01 weight percent, said weight percents being based on the total weight of the polymeric composition; and
(B) a vinylidene chloride interpolymer formed from a monomer mixture comprising vinylidene chloride in an amount of from about 60 to about 99 weight percent, said weight percents being based on the total weight of the monomer mixture, and at least one ethylenically unsaturated comonomer copolymerizable therewith in an amount of from about 1 to about 40 weight percent, said weight percents being based on the total weight of the monomer mixture.

10. An article for the storage of foods, said article formed from a pellet comprising a polymeric composition which comprises
(A) a Group IIA alkaline-earth hydroxyphosphate selected from the group consisting of beryllium hydroxyphosphate, calcium hydroxyphosphate, magnesium hydroxyphosphate, strontium hydroxyphosphate, barium hydroxyphosphate, radium hydroxyphosphate and mixtures thereof in an amount of from about 0.2 to about 1 weight percent, said weight percents based on the weight of the polymeric composition; and
(B) a vinylidene chloride interpolymer formed from a monomer mixture comprising vinylidene chloride in an amount of from about 60 to about 99 weight percent and at least one ethylenically unsaturated comonomer copolymerizable therewith in an amount of from about 1 to about 40 weight percent, said weight percents being based on the total weight of the monomer mixture.

* * * * *